Patented Sept. 29, 1942

2,297,079

UNITED STATES PATENT OFFICE 2,297,079

SOLUTION OF CHEMOTHERAPEUTIC AGENTS IN ETHYLIDENE GLYCEROL

Horace A. Shonle, Indianapolis, Ind., assignor to Eli Lilly and Company, Indianapolis, Ind., a corporation of Indiana No Drawing. Application August 17, 1940, Serial No. 353,067

6 Claims. (Cl. 167—65)

This invention relates to solutions of chemotherapeutic agents in ethylidene glycerol.

For the parenteral administration of p-aminobenzenesulfonamide (sulfanilamide) or its derivatives, a solvent must be used which dissolves a relatively larger amount of the chemotherapeutic agent than does water, which does not produce any substantial reaction with body tissue, and which is relatively nontoxic.

In accordance with this invention, sulfanilamide or its derivatives are dissolved in ethylidene glycerol and the resulting solution employed for the parenteral administration of the desired chemotherapeutic agent. Pharmacological tests have demonstrated that ethylidene glycerol is admirably suited for this purpose. While sulfanilamide is soluble in water only to the extent of about 0.8 percent, a 20 percent solution of sulfanilamide has been prepared with ethylidene glycerol and showed no signs of precipitation after several months standing. 2-(p-aminobenzene-sulfonamido) pyridine (sulfapyridine) is soluble only to the extent of 0.03 percent in water, while it is soluble to approximately 7½ percent in ethylidene glycerol.

When ethylidene glycerol is administered orally to mice the $LD_{50}$, or the lethal dose that killed fifty percent of the mice tested, was found to be 7.224±0.348 cc. per kilogram of body weight; subcutaneously 6.409±0.171 cc. per kilogram of body weight; intramuscularly 5.839±0.519 cc. per kilogram of body weight; and intravenously 3.617±0.180 cc. per kilogram of body weight. On subcutaneous or intramuscular injection, ethylidene produces but slight irritation.

Convenient therapeutic doses of the desired chemotherapeutic agent are dissolved in ethylidene glycerol. This solution may be administered orally, rectally, or parenterally, preferably by the latter method, such as by intramuscular or intravenous administration.

Examples of sulfanilamide derivatives which may be dissolved in ethylidene glycerol to form effective therapeutic solutions are: 2-(p-aminobenzenesulfonamido) thiazol; 2-(p-aminobenzenesulfonamido)-4-methylthiazol; 2-(p-aminobenzenesulfonamido) - 4 - phenylthiazol; $N^4$-trichloroacetyl aminobenzenesulfonamide; $N^4$-α-bromopropionyl aminobenzenesulfonamide; 2-(p-α-bromocaproyl aminobenzenesulfonamido) pyridine; p-aminobenzenesulfon-hydroxamide; p - aminobenzenesulfonethanolamide; $N^1$-acetyl-p - aminobenzenesulfonamide; $N^4$ - acetylaminobenzenesulfonamide (which has a very low activity and is less soluble than the $N^4$-trichloroacetyl derivative); p - aminobenzenesulfonphenylhydroxamide; p-acetylaminobenzenesulfonphenylhydroxamide; and p-aminobenzenesulfondimethylamide. The p-aminobenzenesulfondimethylamide is not so soluble in ethylidene glycerol as are the former derivatives.

Most of the derivatives of sulfanilamide are soluble to a marked degree in ethylidene glycerol. The solubilities of these different derivatives vary, but they are all many times more soluble in ethylidene glycerol than they are in water.

The required dosage of the particular derivative can be administered in a concentration which causes a minimum of discomfort to the patient. For example, patients who cannot take the usual dose, 1.0 gram, of sulfanilamide orally every four hours, now must be given subcutaneous injections of 0.8 percent water solution of sulfanilamide. This requires over 100 cc. of solution to administer 1 gram. It is possible to dissolve this 1 gram of sulfanilamide in 5 cc. of ethylidene glycerol.

The volume of ethylidene glycerol employed to dissolve these substances and other derivatives of sulfanilamide may be varied within wide limits. Preferably the chemotherapeutic compound is completely dissolved in sufficient ethylidene glycerol. Due to the marked solubility of sulfanilamide and its derivatives in the ethylidene glycerol, the usual dosage of the chemotherapeutic agent can be administered without unduly increasing the volume. For the comfort of the patient, it is undesirable to increase the volume to too great an extent. The most desirable volume employed is dictated by the dosage required and the solubility of the substance in the ethylidene glycerol. A plurality of derivatives of sulfanilamide may be dissolved in the ethylidene glycerol for administration to a patient. Likewise, other substances may be in solution in the ethylidene glycerol as well as sulfanilamide or its derivatives or a plurality of sulfanilamide compounds.

The solutions are relatively easily prepared; for example, 10 grams of sulfanilamide are dissolved in about 43 cc. of ethylidene glycerol with warming. The solution is cooled and made up to 50 cc. volume with ethylidene glycerol. This is filtered and is then ready for use after sterilizing. If a lesser concentration is required, the solution may be diluted with ethylidene glycerol.

If 10 percent solutions of 2-(p-aminobenzenesulfonamido)-thiazol, $N^4$-trichloroacetyl aminobenzenesulfonamide, or p-aminobenzenesulfonhydroxamide are desired, one may dissolve 10 grams of the substance in 80 to 90 cc. of ethylidene glycerol with warming. On cooling, the solution is made up to 100 cc. volume with ethylidene glycerol. The solution is then filtered and is ready for use after sterilizing.

If sulfapyridine is required, 7½ grams of sulfapyridine are dissolved with warming in 80 to 90 cc. of ethylidene glycerol. On cooling, a solution is made up to 100 cc. volume with ethylidene glycerol. After filtering and sterilizing the solution is ready for use.

While preferred embodiments of this invention have been described, various modifications may be made therein without departing from the scope of the appended claims.

What is claimed is:

1. A solution of a p-aminobenzenesulfonamide in ethylidene glycerol.
2. A solution of a derivative of p-aminobenzenesulfonamide in ethylidene glycerol.
3. A solution of p-aminobenzenesulfonamide in ethylidene glycerol.
4. A solution of an $N^1$-substituted p-aminobenzene-sulfonamide in ethylidene glycerol.
5. A solution of 2-(p-aminobenzenesulfonamido) pyridine in ethylidene glycerol.
6. A solution of 2-(p-aminobenzenesulfonamido) thiazol in ethylidene glycerol.

HORACE A. SHONLE.